(12) United States Patent
Putman et al.

(10) Patent No.: US 11,294,146 B2
(45) Date of Patent: *Apr. 5, 2022

(54) SYSTEMS, DEVICES, AND METHODS FOR AUTOMATIC MICROSCOPIC FOCUS

(71) Applicant: Nanotronics Imaging, Inc., Cuyahoga Falls, OH (US)

(72) Inventors: John B. Putman, Celebration, FL (US); Matthew C. Putman, Brooklyn, NY (US); Julie Orlando, Akron, OH (US); Dylan Fashbaugh, Monmouth Junction, NJ (US)

(73) Assignee: Nanotronics Imaging, Inc., Cuyahoga Falls, OH (US)

( * ) Notice: Subject to any disclaimer, the term of this patent is extended or adjusted under 35 U.S.C. 154(b) by 139 days.

This patent is subject to a terminal disclaimer.

(21) Appl. No.: 16/715,571

(22) Filed: Dec. 16, 2019

(65) Prior Publication Data

US 2020/0264405 A1 Aug. 20, 2020

Related U.S. Application Data

(63) Continuation of application No. 16/275,177, filed on Feb. 13, 2019, now Pat. No. 10,509,199, which is a
(Continued)

(51) Int. Cl.
*G02B 21/36* (2006.01)
*G02B 7/28* (2021.01)
(Continued)

(52) U.S. Cl.
CPC ............. *G02B 7/285* (2013.01); *G02B 21/02* (2013.01); *G02B 21/06* (2013.01); *G02B 21/244* (2013.01);
(Continued)

(58) Field of Classification Search
CPC .......... G02B 7/28; G02B 7/282; G02B 7/285; G02B 7/287; G02B 7/36; G02B 7/38;
(Continued)

(56) References Cited

U.S. PATENT DOCUMENTS 4,661,692 A 4/1987 Kawasaki
4,945,220 A 7/1990 Mallory et al.
(Continued)

FOREIGN PATENT DOCUMENTS

CN 103635848 3/2014
CN 104204898 12/2014
(Continued)

OTHER PUBLICATIONS

Chow et al., "Nikon Optical Microscope", Technical Paper, UW Nanomech Lab, Jan. 2009, pp. 1-2.
(Continued)

*Primary Examiner* — Arnel C Lavarias
(74) *Attorney, Agent, or Firm* — DLA Piper LLP (US)

(57) ABSTRACT

An automatic focus system for an optical microscope that facilitates faster focusing by using at least two cameras. The first camera can be positioned in a first image forming conjugate plane and receives light from a first illumination source that transmits light in a first wavelength range. The second camera can be positioned at an offset distance from the first image forming conjugate plane and receives light from a second illumination source that transmits light in a second wavelength range.

17 Claims, 8 Drawing Sheets

Related U.S. Application Data continuation of application No. 15/920,850, filed on Mar. 14, 2018, now Pat. No. 10,247,910.

(51) Int. Cl.

| | |
|---|---|
| *G02B 21/06* | (2006.01) |
| *G06T 7/80* | (2017.01) |
| *G02B 21/02* | (2006.01) |
| *G02B 21/24* | (2006.01) |
| *G02B 21/26* | (2006.01) |

(52) U.S. Cl.
CPC ............... *G06T 7/80* (2017.01); *G02B 21/26* (2013.01); *G02B 21/365* (2013.01)

(58) Field of Classification Search
CPC .... G02B 21/00; G02B 21/241; G02B 21/242; G02B 21/244; G02B 21/245
USPC ....... 359/362, 363, 368, 369, 379, 380, 381, 359/382, 383, 385, 388, 389, 390, 432; 250/200, 201.1, 201.2, 201.3, 201.4, 250/201.8
See application file for complete search history.

(56) References Cited

U.S. PATENT DOCUMENTS

| | | | |
|---|---|---|---|
| 5,604,344 | A | 2/1997 | Finarov |
| 5,973,846 | A | 10/1999 | McConica |
| 6,043,475 | A | 3/2000 | Shimada et al. |
| 6,160,607 | A | 12/2000 | Diaconu |
| 6,636,298 | B1 | 10/2003 | Bachelder et al. |
| 6,795,172 | B2 | 9/2004 | Putman et al. |
| 6,879,440 | B2 | 4/2005 | Cemic et al. |
| 7,297,910 | B2 | 11/2007 | Fomitchov |
| 7,345,814 | B2 | 3/2008 | Yoneyama et al. |
| 7,583,380 | B2 | 9/2009 | Van Beek et al. |
| 7,772,535 | B2 | 8/2010 | Krief et al. |
| 8,174,762 | B2 | 5/2012 | Xu et al. |
| 8,576,483 | B2 | 11/2013 | Tanabe et al. |
| 9,091,525 | B2 | 7/2015 | Sulik et al. |
| 9,207,444 | B2 | 12/2015 | Yamamoto et al. |
| 9,488,819 | B2 | 11/2016 | Putman et al. |
| 9,696,686 | B2 | 7/2017 | Sticker et al. |
| 10,247,910 | B1 * | 4/2019 | Putman .................. G02B 21/06 |
| 10,509,199 | B2 * | 12/2019 | Putman ..................... G06T 7/80 |
| 2003/0184856 | A1 | 10/2003 | Otaki |
| 2003/0215725 | A1 | 11/2003 | Watanabe |
| 2005/0063049 | A1 | 3/2005 | Steenblik et al. |
| 2005/0089208 | A1 | 4/2005 | Dong et al. |
| 2005/0121596 | A1 | 6/2005 | Kam et al. |
| 2007/0152130 | A1 | 7/2007 | Fomitchov |
| 2008/0219654 | A1 | 9/2008 | Border et al. |
| 2009/0225199 | A1 | 9/2009 | Ferren |
| 2010/0033811 | A1 | 2/2010 | Westphal et al. |
| 2010/0182680 | A1 | 7/2010 | Hayashi |
| 2014/0204196 | A1 | 7/2014 | Loney et al. |
| 2015/0070655 | A1 | 3/2015 | Rossi |
| 2016/0216504 | A1 | 7/2016 | Hing et al. |
| 2017/0329122 | A1 | 11/2017 | Osawa |

FOREIGN PATENT DOCUMENTS

| | | |
|---|---|---|
| CN | 103513411 | 2/2016 |
| DE | 10112639 | 9/2002 |
| JP | 19940209734 | 3/1996 |
| JP | 19970363313 | 9/1998 |
| JP | 2005-189876 | 7/2005 |
| JP | 2006-154358 | 6/2006 |
| JP | 2009-522604 | 6/2009 |
| JP | 2012181341 | 9/2012 |
| KR | 10-2006-0108461 | 10/2006 |
| TW | 201732261 | 9/2017 |
| WO | WO 2014/036276 | 3/2014 |
| WO | WO 2016/133787 | 8/2016 |

OTHER PUBLICATIONS

Edmund Optics, "Crosshair Scale Contact Reticles", retrieved Jun. 29, 2020, pp. 1-3, available at: https://www.edmundoptics.com/microscopy/magnifiers/contact-reticles/crosshair-scale-contact-reticles/.

Google, "Microscope Reticle", retrieved Jun. 12, 2020, pp. 1-2, available at: https://www.google.com/search?q=microscope+reticle&source=lnms&tbm=isch&sa=X&ved=0ahUKEwiWw9voyOfZAhXLtlkKHWW3A2cQ_AUICygC&biw=191.

Groen et al., "A Comparison of Different Focus Functions for Use in Autofocus Algorithms", in Cytometry, Mar. 1985, pp. 81-91.

International Search Report and Written Opinion dated Jun. 17, 2019 in International Patent Application No. PCT/US2019/022070, pp. 1-6.

International Search Report and Written Opinion dated Jul. 10, 2019 in International Patent Application No. PCT/US2019/029076, pp. 1-6.

Liu et al., "Dynamic Evaluation of Autofocusing for Automated Microscopic Analysis of Blood Smear and Pap", in Journal of Microscopy, vol. 227, pt. 1, Jan. 2007, pp. 15-23.

Marvell Nanofabrication Laboratory, "NanoSpec Film Thickness Measurement System", Lab Manual, University of California, publicly available on or before Nov. 22, 2016, Berkeley, pp. 1-5.

McKeogh et al., "A Low-Cost Automatic Translation and Autofocusing System for a Microscope", in Measurement Science and Technology, vol. 6, No. 5, Jan. 1995, pp. 583-587.

Molecular Expressions, "Optical Microscopy Primer—Anatomy of the Microscope: Kohler Microscope Illumination", publicly available on or before Dec. 26, 2016, pp. 1-10, available at: https://micro.magnet.fsu.edu/primer/anatomy/kohler.html.

Motion X Corporation, "FocusTrac Laser Auto Focus Systems", Technical Paper, retrieved May 7, 2012, pp. 1-3.

Nikon Instruments, "Perfect Focus System", last accessed Mar. 31, 2012, available at http://www.nikoninstruments.com/Information-Center/Perfect-Focus-System-PFS, pp. 1-3.

Nikon Microscopy U, "Cojugate Planes in Optical Microscopy", last accessed Feb. 27, 2018, available at https://www.microscopyu.com/microscopy-basics/conjugate-planes-in-optical-microscopy, pp. 1-8.

Nikon Microscopy U, "Depth of Field and Depth of Focus", last accessed May 8, 2012, available at https://www.microscopyu.com/microscopy-basics/depth-of-field-and-depth-of-focus, pp. 1-3.

Nikon Microscopy U, "Objective Working Distance", last accessed May 8, 2012, available at https://www.microscopyu.com/tutorials/workingdistance, pp. 1-2.

Nikon Microscopy U, "Properties of Microscope Objective", last accessed May 13, 2012, available at https://www.microscopyu.com/microscopy-basics/properties-of-microscope-objectives, pp. 1-7.

Nikon Microscopy U, "The Automatic Microscope", last accessed May 7, 2012, available at https://www.microscopyu.com/applications/live-cell-imaging/the-automatic-microscope, pp. 1-12.

Notice of Allowance dated Feb. 3, 2020 in U.S. Appl. No. 16/207,727, pp. 1-18.

Notice of Allowance dated Aug. 19, 2019 in U.S. Appl. No. 16/275,177, pp. 1-45.

Notice of Allowance dated Oct. 3, 2018 in U.S. Appl. No. 15/967,802, pp. 1-23.

Notice of Allowance dated Dec. 18, 2018 in U.S. Appl. No. 15/920,850, pp. 1-32.

Notice of Allowance dated Feb. 3, 2020 in TW Patent Application No. 108114583, pp. 1-5.

Objective Imaging, "OASIS-AF AutoFocus Module", Technical Paper, 2001, pp. 1-2.

Office Action dated May 7, 2019 in U.S. Appl. No. 16/275,177, pp. 1-55.

Office Action dated Jun. 5, 2020 in TW Patent Application No. 108107864, pp. 1-3.

Office Action dated Jul. 30, 2018 in U.S. Appl. No. 15/920,850, pp. 1-33.

(56) References Cited

OTHER PUBLICATIONS

Office Action dated Sep. 27, 2018 in U.S. Appl. No. 15/920,850, pp. 1-23.
Office Action dated Nov. 4, 2019 in TW Patent Application No. 108107864, pp. 1-6.
Prior Scientific, "Product Information", last accessed May 7, 2012, available at https://www.prior.com/productinfo_auto_focusoptions.html, pp. 1-12.
Spencer, "Fundamentals of Light Microscopy: Microscope Alignment", University of Cambridge, 1982, pp. 3-7.
Yazdanfar et al., "Simple and Robust Image-Based Autofocusing for Digital Microscopy", in Optics Express, vol. 16, No. 12, Jun. 9, 2008, pp. 1-8.
Zeiss, "Field Iris Diaphragm Function", retrieved on Jun. 12, 2020, pp. 1-2, available at: http://zeiss-campus.magnet.fsu.edu/tutorials/basics/fielddiaphragm/indexflash.html.

\* cited by examiner

SYSTEMS, DEVICES, AND METHODS FOR AUTOMATIC MICROSCOPIC FOCUS

CROSS REFERENCE TO RELATED APPLICATION

This application is a continuation of U.S. patent application Ser. No. 16/275,177, filed on Feb. 13, 2019, which is a continuation of U.S. patent application Ser. No. 15/920,850, filed Mar. 14, 2018, each of which is hereby incorporated by reference herein in its entirety.

TECHNICAL FIELD

The present disclosure relates to image-based mechanisms for automatic microscopic focus.

BACKGROUND

Most specimens that are observed with a microscope have small variations in height across their surfaces. While these variations are frequently not visible to the human eye, they can cause images of a portion of a specimen captured by a microscope to be out of focus.

The range in which a microscope can create a usable focused image is known as the depth of field. The microscope must keep a portion of a specimen within its depth of field to generate useful images. However, when transitioning from observing a first portion of a specimen to observing a second portion of the specimen, the small variations in height of the specimen may cause the second portion to be outside the depth of field.

Different sharpness measurements such as image contrast, resolution, entropy and/or spatial frequency content, among others, can be used to measure the quality of focus of images captured by a microscope. Generally, when a specimen is in focus, the captured image will exhibit the best sharpness quality (e.g., large contrast, a high range of intensity values and sharp edges). The different sharpness measurements that can be used to determine when a specimen is in focus usually require capturing a series of images and increasing or decreasing the distance between the microscope objective lens and the specimen until the image appears in focus. This increases the total microscopic scan time of each specimen, making methods using such measurement prohibitively slow for high throughput scanning applications.

Accordingly, it is desirable to find a suitable in-focus plane of a specimen using a smaller number of images.

SUMMARY

Systems, methods, and media for automatic microscopic focus are provided.

In some embodiments, systems for automatically focusing a microscope are provided, the systems comprising: an objective; a stage for positioning a specimen on a first image forming conjugate plane; a first camera, configured for focusing, positioned on a second image forming conjugate plane; a second camera, configured for focusing, positioned at an offset distance from the second image forming conjugate plane; a primary illumination source that emits light in a first wavelength range, wherein the emitted light is received by the first camera; a secondary illumination source that emits light in a second wavelength range which is different from the first wavelength range and that projects light through a focusing pattern that is positioned on a third image forming conjugate plane, wherein the projected light is received by the second camera; and a hardware processor coupled to the first camera and the second camera that is configured to: determine, using the first camera, when a specimen is in focus based on a sharpness value; determine, using the second camera, a sharpness setpoint for the specimen when the specimen is determined to be in focus for the first camera; after movement of the specimen, determine, using the second camera, a first sharpness value of the specimen; determine whether the first sharpness value of the specimen is higher or lower than the sharpness setpoint; and adjust a distance between the objective and the stage so that a second sharpness value of the specimen determined using the second camera corresponds to the sharpness setpoint.

In some embodiments, systems for automatically focusing a microscope are provided, the systems comprising: an objective; a stage for positioning a specimen on a first image forming conjugate plane; a first camera, configured for taking images of the specimen when the specimen is determined to be in focus, positioned on a second image forming conjugate plane; a second camera, configured for focusing, positioned on a third image forming conjugate plane; a third camera, configured for focusing, positioned at an offset distance from the third image forming conjugate plane; a primary illumination source that emits light in a first wavelength range, wherein the emitted light is received by the first camera; a secondary illumination source that emits light in a second wavelength range which is different from the first wavelength range and that projects light through a focusing pattern that is positioned on a fourth image forming conjugate plane, wherein the projected light is received by the second and third camera; and a hardware processor coupled to the second camera and the third camera that is configured to: determine, using the second camera, when a specimen is in focus based on a sharpness value; determine, using the third camera, a sharpness setpoint for the specimen when the specimen is determined to be in focus for the second camera; after movement of the specimen, determine, using the third camera, a first sharpness value of the specimen; determine whether the first sharpness value of the specimen is higher or lower than the sharpness setpoint; and adjust a distance between the objective and the stage so that a second sharpness value of the specimen determined using the third camera corresponds to the sharpness setpoint.

In some embodiments, methods for automatically focusing a microscope are provided, the methods comprising: positioning a specimen on a stage on a first image forming conjugate plane; positioning a first camera, configured for focusing, on a second image forming conjugate plane; positioning a second camera, configured for focusing, at an offset distance from the second image forming conjugate plane; emitting, from a primary illumination source, light in a first wavelength range, wherein the emitted light is received by the first camera; emitting, from a secondary illumination source, light in a second wavelength range which is different from the first wavelength range, wherein the light is projected through a focusing pattern that is positioned on a third image forming conjugate plane, wherein the projected light is received by the second camera; determining, by a hardware processor using the first camera, when a specimen is in focus based on a sharpness value; determining, by the hardware processor using the second camera, a sharpness setpoint for the specimen when the specimen is determined to be in focus for the first camera; after movement of the specimen, determining, by the hardware processor using the second camera, a first sharpness value of the specimen; determining, by the hardware processor, whether the first sharpness value of the specimen is higher or lower than the sharpness setpoint; and adjusting, by the hardware processor, a distance between an objective and the stage so that a second sharpness value of the specimen determined using the second camera corresponds to the sharpness setpoint.

In some embodiments, methods for automatically focusing a microscope are provided, the methods comprising: positioning a specimen on a stage on a first image forming conjugate plane; positioning a first camera, configured for taking images of the specimen when the specimen is determined to be in focus, on a second image forming conjugate plane; positioning a second camera, configured for focusing, on a third image forming conjugate plane; positioning a third camera, configured for focusing, at an offset distance from the third image forming conjugate plane; emitting, from a primary illumination source, light in a first wavelength range, wherein the emitted light is received by the first camera; emitting, from a secondary illumination source, light in a second wavelength range which is different from the first wavelength range, wherein the light is projected through a focusing pattern that is positioned on a fourth image forming conjugate plane, wherein the projected light is received by the second and third camera; determining, by a hardware processor using the second camera, when a specimen is in focus based on a sharpness value; determining, by the hardware processor using the third camera, a sharpness setpoint for the specimen when the specimen is determined to be in focus for the second camera; after movement of the specimen, determining, by the hardware processor using the third camera, a first sharpness value of the specimen; determining, by the hardware processor, whether the first sharpness value of the specimen is higher or lower than the sharpness setpoint; and adjusting, by the hardware processor, a distance between the objective and the stage so that a second sharpness value of the specimen determined using the third camera corresponds to the sharpness setpoint.

DETAILED DESCRIPTION

In accordance with some embodiments of the disclosed subject matter, mechanisms (which can include systems, methods, devices, apparatuses, etc.) for automatic microscopic focus of specimens are provided.

Figure 1:
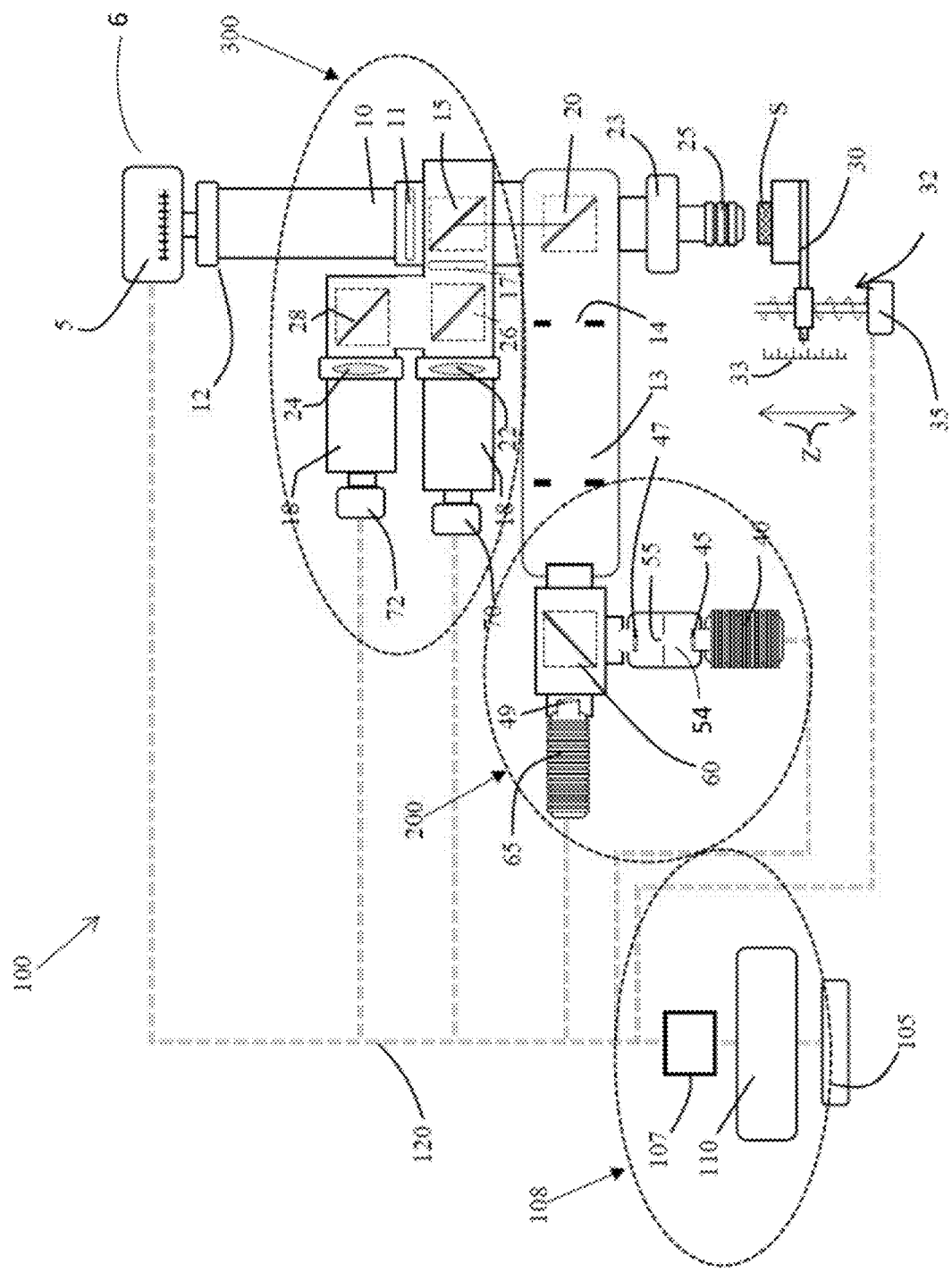
FIG. 1 shows an example of an automatic focus system in accordance with some embodiments of the disclosed subject matter.

FIG. 1 illustrates an example 100 of an automatic focus system according to some embodiments of the disclosed subject matter. At a high level, the basic components of automatic focus system 100, according to some embodiments, include an illumination unit 200 for providing light, a focusing unit 300 for finding the in-focus plane of a specimen, a vertical illuminator 13, an imaging camera 5, an objective 25, a stage 30, and a control system 108 comprising hardware, software, and/or firmware.

Automatic focus system 100 can be implemented as part of any suitable type of microscope. For example, in some embodiments, system 100 can be implemented as part of an optical microscope that uses transmitted light or reflected light. More particularly, system 100 can be implemented as part of the nSpec® optical microscope available from Nanotronics Imaging, Inc. of Cuyahoga Falls, Ohio. Although the following description refers to a reflected light vertical illuminator 13, the mechanisms described herein can be a part of microscopes that do not use a reflected light vertical illuminator.

According to some embodiments, the microscope can include one or more objectives 25. The objectives can have different magnification powers and/or be configured to operate with brightfield/darkfield microscopy, differential interference contrast (DIC) microscopy and/or any other suitable form of microscopy. The objective and/or microscopy technique used to inspect a specimen can be controlled by software, hardware, and/or firmware in some embodiments.

In some embodiments, a fine focus actuator 23 can be used to drive objective 25 in a Z direction towards and away from stage 30. Fine focus actuator 23 can be designed for high precision and fine focus adjustment of objective 25. Fine focus actuator 23 can be a stepper motor, servo motor, linear actuator, piezo motor, and/or any other suitable mechanism. For example, in some embodiments, a piezo motor can be used and can drive the objective 0 to 50 micrometers (µm), 0 to 100 µm, or 0 to 200 µm, and/or any other suitable range(s) of distances.

In some embodiments, an XY translation stage can be used for stage 30. The XY translation stage can be driven by stepper motor, servo motor, linear motor, and/or any other suitable mechanism.

In some embodiments, focus unit 32, comprising actuator 35, can be used to adjust stage 30 in a Z direction towards and away from objective 25. Actuator 35 can be used to make coarse focus adjustments of, for example, 0 to 5 mm, 0 to 10 mm, 0 to 30 mm, and/or any other suitable range(s) of distances. Actuator 35 can also be used to move stage 30 up and down to allow specimens of different thicknesses to be placed on the stage. Actuator 35 can also be used in some embodiments to provide fine focus of, for example, 0 to 50 µm, 0 to 100 µm, 0 to 200 µm, and/or any other suitable range(s) of distances. In some embodiments, focusing unit 32 can also include a location device 33. The location device can be configured to store an absolute position of stage 30 (e.g., the position of the stage when a specimen is in focus), even upon reset and/or power cycling of autofocus system 100. In some embodiments, the location device can be a linear encoder, a rotary encoder or any other suitable mechanism to track the absolute position of stage 30 with respect to the objective.

In some embodiments, automatic focus system 100, when it is properly focused and aligned, can include a set of conjugate focal planes, for example an image-forming conjugate set, that occur along the optical pathway through the microscope. Each plane within the image-forming conjugate set is conjugate with the others in that set because the planes are simultaneously in focus and can be viewed superimposed upon one another when observing specimens through the microscope. The set of image-forming conjugate planes in automatic focus system 100 can include a primary focusing camera 72 image plane, an imaging camera 5 image plane, a focusing pattern 55 image plane, a field diaphragm (F-stop) 14 image plane and a specimen image plane. More specifically, all references herein to positioning a primary focusing camera 72 and imaging camera 5 on the image-forming conjugate planes refer to positioning the sensors within cameras 5 and 7 on the image-forming conjugate planes.

In some embodiments, focusing pattern 55 can be formed from opaque material, with a pattern cut out of the material. The cutout section of the material allows light to pass through to the specimen image plane, while the opaque material section blocks light from passing through. In other embodiments, focusing pattern 55 can be formed from clear material such as clear glass or clear plastic that has an opaque pattern thereon which causes an image to be projected on the specimen image plane by light passing through the clear glass or plastic.

In some embodiments, imaging camera 5 can include an image sensor 6 that is positioned on an image-forming conjugate plane of automatic focus system 100. Imaging camera 5 can be used to capture images of a specimen once control system 108 determines that the specimen is in focus. Image sensor 6 can be, for example, a CCD, CMOS and/or any other suitable electronic device that allows images of a specimen to be captured and stored.

In some embodiments, control system 108, comprising controller 110 and controller interface 107, can control any settings of the components of automatic focus system 100 (e.g., actuators 35 and 23, primary illumination source 65, secondary illumination source 40, focusing cameras 70 and 72, stage 30, focusing pattern 55, imaging camera 5 and objective 25), as well as communications, operations (e.g., taking images, turning on and off an illumination source, moving stage 30 and objective 25, storing different values associated with a specimen) and calculations (e.g., sharpness calculations) performed by, and between, components of the automatic focus system. Control system 108 can include any suitable hardware (which can execute software in some embodiments), such as, for example, computers, microprocessors, microcontrollers, application specific integrated circuits (ASICs), and digital signal processors (any of which can be referred to as a hardware processor), encoders, circuitry to read encoders, memory devices (including one or more EPROMS, one or more EEPROMs, dynamic random access memory ("DRAM"), static random access memory ("SRAM"), and/or flash memory), and/or any other suitable hardware elements. In some embodiments, individual components within automatic focus system 100 can include their own software, firmware, and/or hardware to control the individual components and communicate with other components in automatic focus system 100.

In some embodiments, communication 120 between the control system (e.g., controller 110 and controller interface 107) and the components of automatic focus system 100 can use analog technologies (e.g., relay logic), digital technologies (e.g., using RS232, ethernet, or wireless) and/or any other suitable communication technologies.

In some embodiments, operator inputs can be communicated to the control system using any suitable input device (e.g., a keyboard, mouse or joystick).

Figure 2:
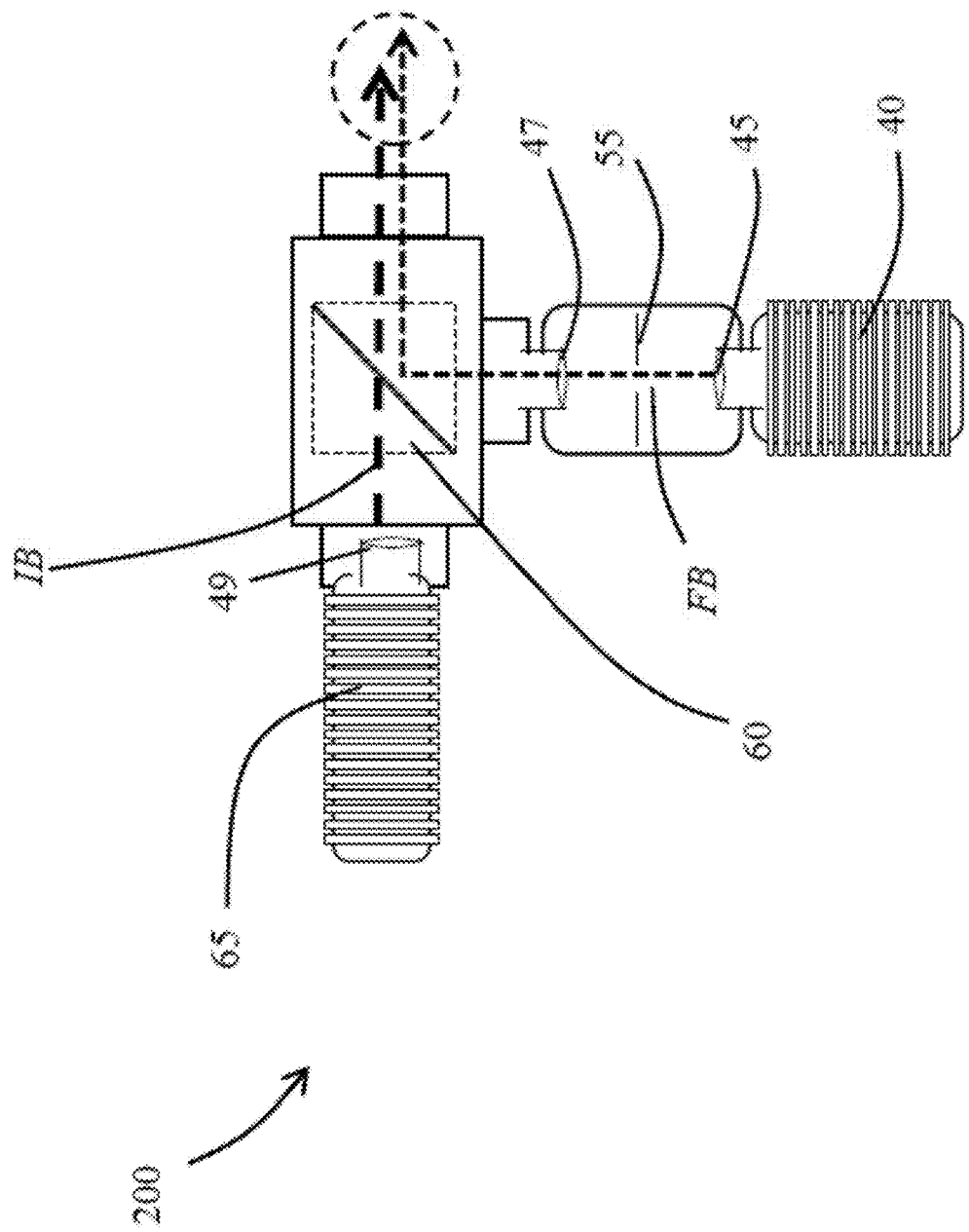
FIG. 2 shows an example of an illumination unit in accordance with some embodiments of the disclosed subject matter.

FIG. 2 shows the general configuration of an embodiment of an illumination unit of the automatic focus system, in accordance with some embodiments of the disclosed subject matter. The illumination unit 200 can include two illumination sources, for example a primary illumination source 65 and a secondary illumination source 40. The illumination sources can provide light beams in ranges of wavelengths that are different from each other.

In some embodiments, for example, primary illumination source 65 provides a light beam having a wavelength in the range of 451 to 750 nanometers (nm), while the secondary illumination source 40 provides a light beam having a wavelength that is higher or lower than the range of wavelengths used for the primary source. For example, the wavelength range of the primary illumination source 65 can be in the range of 550 to 750 nm and the wavelength range of the secondary illumination source can be in the range of 400 to 450 nm. Light of any wavelength range can be used for primary illumination source 65 as long as the value of the range is known and can be separated from other wavelengths using known filtering techniques. Similarly, light of any wavelength range can be used for secondary illumination source 40, as long as the light is not in the same wavelength range as primary illumination source 65.

In some embodiments, as shown in FIG. 1, primary illumination source 65 is positioned so that its light is transmitted in a horizontal direction towards vertical illuminator 13. Primary illumination source 65 can include a focusing lens 49 (e.g., a double convex lens) for focusing the primary light beam. The secondary illumination source 40 can be positioned at a suitable distance below focusing pattern 55 located on image-forming conjugate plane 54. The diameter of focusing pattern 55 (e.g., 5 mm) can be adjusted so that a projection of focusing pattern 55 is smaller than the field of view (FOV) of focusing cameras 70 and 72. Focusing pattern 55 can be any suitable geometric shape for example, a circle, rectangle, triangle, or hexagon. Focusing pattern 55 can also include a series of discrete openings, so that when light is transmitted through the discrete openings, the lines and spaces are projected across the field of view. In some embodiments, the location of primary illumination source 65 and secondary illumination source 40 can be switched.

In some embodiments, automatic focus system 100 can be configured so that light from secondary illumination source 40 is continuously transmitted through focusing pattern 55 in order to continuously project the focusing pattern image on a specimen that can be captured by focusing cameras 70 and 72. The continuous projection of the focusing pattern image can facilitate sharpness focus of a specimen, especially for transparent specimens or for specimens that lack any visually recognizable features. Focusing pattern 55 can be used instead of, or in addition to, a field diaphragm, for sharpness focusing. For example, automatic focus system 100, in addition to focusing pattern 55, can also include a field diaphragm (F-stop) 14 that can be located in the vertical illuminator 13. Field diaphragm 14 can also be positioned on an image-forming conjugate plane of automatic focus system 100. In some embodiments, field diaphragm 14 controls the diameter of light emitted by illumination source 65 and 40 and transmitted to objective 25. More specifically, in some embodiments, by reducing the size of the field diaphragm, the diameter of the light passing through is reduced. This creates a dark outline around the image of the specimen received by focusing cameras 70 and 72 and can be used to adjust the focus of the specimen (e.g., by moving the specimen and objective closer together or farther apart). At the point of greatest measured sharpness, the specimen is considered to be in-focus and the field diaphragm can be opened to a larger size to allow imaging of the specimen by imaging camera 5. Reducing the field diaphragm and returning it to its original size, however, takes time (e.g., 2-5 seconds) and can slow down the scanning process and throughput.

Focusing pattern 55 can be positioned on an any suitable image-forming conjugate plane of automatic focus system 100 (e.g., above secondary illumination source 40 (as shown in FIG. 1), or at field diaphragm 14), as long as an appropriate filter is used, when necessary, to make sure that focusing pattern 55 is not projected onto imaging camera 5. For example, if focusing pattern 55 is positioned on the field diaphragm 14 image forming conjugate plane, in place of field diaphragm 14, then a filter would be necessary. In some embodiments, a band filter can be located on the field diaphragm image forming conjugate plane (in place of field diaphragm 14) and a focusing pattern in the form of a pattern cutout can be created in the band filter. More specifically, a band filter can be selected that transmits light in the same wavelength range of primary illumination source 65 (e.g., greater than 450 nm) and blocks light in the same wavelength range of secondary illumination source 40 (e.g., less than or equal to 450 nm), except in the focusing pattern 55 region. In other words, light in the same wavelength range of secondary illumination 40 source would be blocked except in the region of focusing pattern 55, which would allow the light from secondary illumination 40 to be transmitted through to focusing cameras 70 and 72. As described below, in connection with FIG. 4, optical filter 11 ensures that only light from the primary illumination source 65 is transmitted to imaging camera 5.

Note that, in some embodiments, any suitable illumination source can be used with illumination unit 200, such as a 400 nm ultraviolet collimated light-emitting diode (LED) for secondary illumination source 40 and a 5500K white light collimated LED for primary illumination source 65.

In some embodiments focusing lens 45 (e.g., a 60 mm focal length bioconvex lens) can be placed at a suitable distance between the secondary illumination source 40 and focusing pattern 55. Further, another focusing lens 47 can be placed at a suitable distance on the other side of focusing pattern 55. In some embodiments, the distance of the lenses 45 and 47 from focusing pattern 55 can be based on the optical characteristics of the microscope to ensure the focusing of the light and positioning of focusing pattern 55 to be in a conjugate image-forming plane.

In some embodiments, a dichroic 60 is placed in the optical pathway of both primary illumination source 65 and secondary illumination source 40 before the light travels to vertical illuminator 13. Dichroic, as used herein, can refer to mirrors, beam splitters, filters or beam combiners that transmits light of a known, specified wavelength and combines the with a light of another known, specified wavelength. Note that a combination of the aforementioned devices can be used to reflect and transmit the desired illumination sources and wavelengths. In some embodiments, a dichroic having a specific cut-off wavelength is selected in order to reflect the wavelengths of light emitted by secondary illumination source 40 and to allow the wavelengths of light emitted from primary illumination source 65 to pass through. For example, if secondary illumination source 40 emits light in a wavelength range of 400-450 nm and primary illumination source 65 emits light in a wavelength range of 550-750 nm, then a 450 nm cutoff dichroic (i.e., a dichroic that reflects light with a wavelength of 450 nm and below and allows light with a wavelength greater than 450 nm to pass through thereby combining the beams) can be used to reflect light from secondary illumination source 40 and to allow light from primary illumination source 65 to pass through. Dichroic 60 can be designed for a 45° angle of incidence, so that rejected light from secondary illumination source 40 is reflected at an angle of 90° and travels parallel to the light path from primary illumination source 65.

In some embodiments, primary illumination source 65 can be the light source used for imaging a specimen on imaging sensor 6 in imaging camera 5 and secondary illumination source 40 can be the light source used for imaging a specimen on focusing sensors 71 and 73 of focusing cameras 70 and 72.

Note that, in some embodiments any suitable dichroic, illuminator, illumination source, focusing lens, sensor and focusing pattern can be used with illuminating unit 200. In some embodiments, any suitable arrangement of these components can be used with illuminating unit 200. In some embodiments, the components of illuminating unit 200 can be mounted to illuminator 13 in any suitable manner, such as by using guide rods in a similar manner to how focusing camera 72 is shown as being mounted to focusing housing 18 in FIG. 3 (described below), in order to allow variable geometry.

Figure 3:
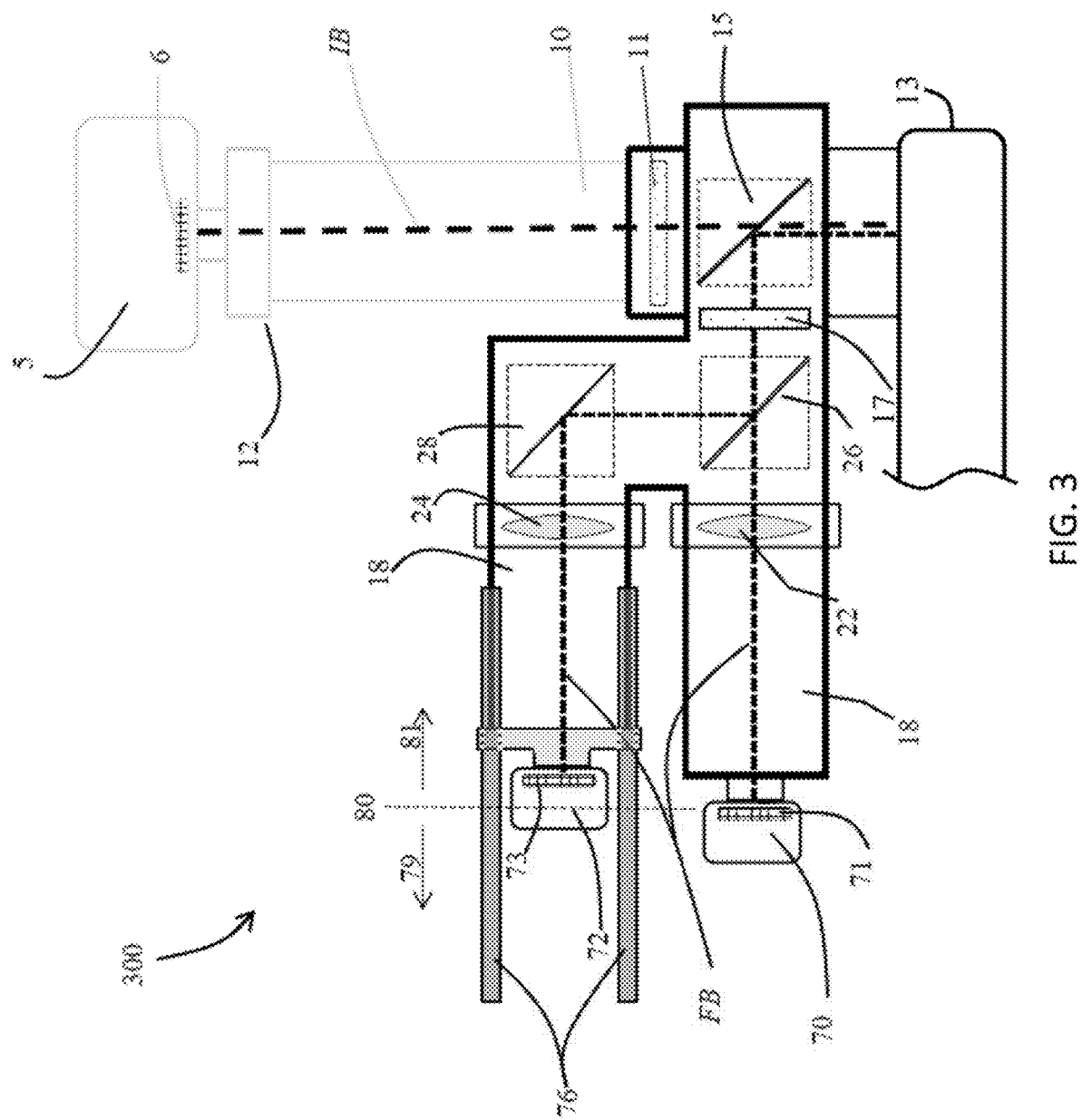
FIG. 3 shows an example of a focusing unit in accordance with some embodiments of the disclosed subject matter.

FIG. 3 shows an example of a general configuration of an embodiment of a focusing unit of the automatic focus system, in accordance with some embodiments of the disclosed subject matter. The focusing unit 300 can include two cameras: a primary focusing camera 70 and an offset focusing camera 72. These cameras can include, for example, a charged coupled device (CCD) image sensor, a CMOS image sensor and/or any other suitable image sensor that allows images of a specimen to be captured. In some embodiments, the captured image is stored and analyzed by control system 108.

The focusing unit 300 can be mounted in an area between vertical illuminator 13 and imaging camera lens tube 10. This area is known as infinity space. In some embodiments, the focusing unit 300 can be mounted in other locations using appropriate components to adapt the selected location to the optical characteristics of the system.

Primary focusing camera 70 can include a sensor 71 that is positioned on an image-forming conjugate plane of automatic focus system 100 (as represented for example by line 80).

An offset focusing camera 72 can include a sensor 73 that can be positioned at an offset to image-forming conjugate plane 80. The offset can be either be in the positive direction 81 or the negative direction 79. Offset focusing camera 72 can be located above or below primary focusing camera 70. Offset focusing camera 72 can be movable along guide rods 76 or any other suitable structure in order to adjust an offset distance of offset camera 72. The offset distance can be adjusted based on the calculated sharpness curves for offset focusing camera 72 at different distances from the image-forming conjugate plane 80, as discussed below in connection with FIG. 7.

The focusing unit 300 can also include two focusing lenses 24 and 22. Focusing lens 22 can be placed in the same horizontal optical pathway as primary focusing camera 70 and focusing lens 24 can be placed in the same horizontal optical pathway as offset focusing camera 72. In some embodiments, focusing lenses 22 and 24 achieve the same focal distance as microscope tube lens 10, to ensure that sensors 71 and 73 are each in focus when they are positioned on the image-forming conjugate plane 80. Microscope tube lens 10 can include a lens (not shown) for focusing an image of a specimen on sensor 6, so that the specimen is in focus when sensor 6 is positioned on an image-forming conjugate plane of automatic focus system 100.

Note that in some embodiments, lenses 22 and 24 can be double convex lenses or any other suitable type lenses. In some embodiments, the focal length of the lenses can be based on the optical characteristics of the microscope.

As also shown in FIG. 3, focusing unit 300 can also include a cutoff dichroic 15 that is positioned above vertical illuminator 13 in the optical pathway of the light reflected off a specimen. The dichroic 15 is positioned so that the light reflected off the specimen that is below the cutoff of the dichroic is reflected at an angle of 90° towards primary focusing camera 70. A dichroic having a specific cut-off wavelength can be selected in order to reflect the wavelengths of light emitted by secondary illumination source 40 (the "focusing beam"). For example, if the focusing beam is in the range of 400 to 450 nm, then a 450 nm cut-off filter can be used with focusing unit 300 in order to reflect the focusing beam towards primary focusing camera 70.

In some embodiments, focusing unit 300 can include a beam splitter 26 that can be positioned between dichroic 15 and primary focusing camera 70. The beam splitter 26 can be, for example, a 50/50 beam splitter designed to send 50% of the focusing light beam to primary focusing camera 70 and 50% of the focusing light beam to offset focusing camera 72. A mirror 28 can be placed at a distance directly above beam splitter 26 and can be designed to direct the beam of light from beam splitter 26 to offset focusing camera 72.

In some embodiments, a cut-off filter 17 can be positioned between dichroic 15 and beam splitter 26 to filter out any light coming from primary illumination source 65 (the "imaging beam"). For example, if imaging beam has a wavelength in the range of 450 nm and above, then a 450 nm cutoff filter can be used to filter out the imaging beam and prevent the imaging beam from transmitting light to focusing cameras 70 and 72. In other embodiments, two cut-off filters can be used and each filter can be placed, for example, in front of or behind lenses 22 and 24.

Note that, in some embodiments any suitable dichroic, focusing camera, focusing lens, mirror, image sensor, beam splitter and cut-off filter can be used with focusing unit 300. In some embodiments, any suitable arrangement of these components can be used with focusing unit 300. The components of focusing unit 300 can be mounted to guide rods or any other suitable structure for connecting the components. Further, in some embodiments, primary focusing camera 70 is not necessary and the focusing operations described herein for primary focusing camera 70, can instead be performed by imaging camera 5.

Figure 4:
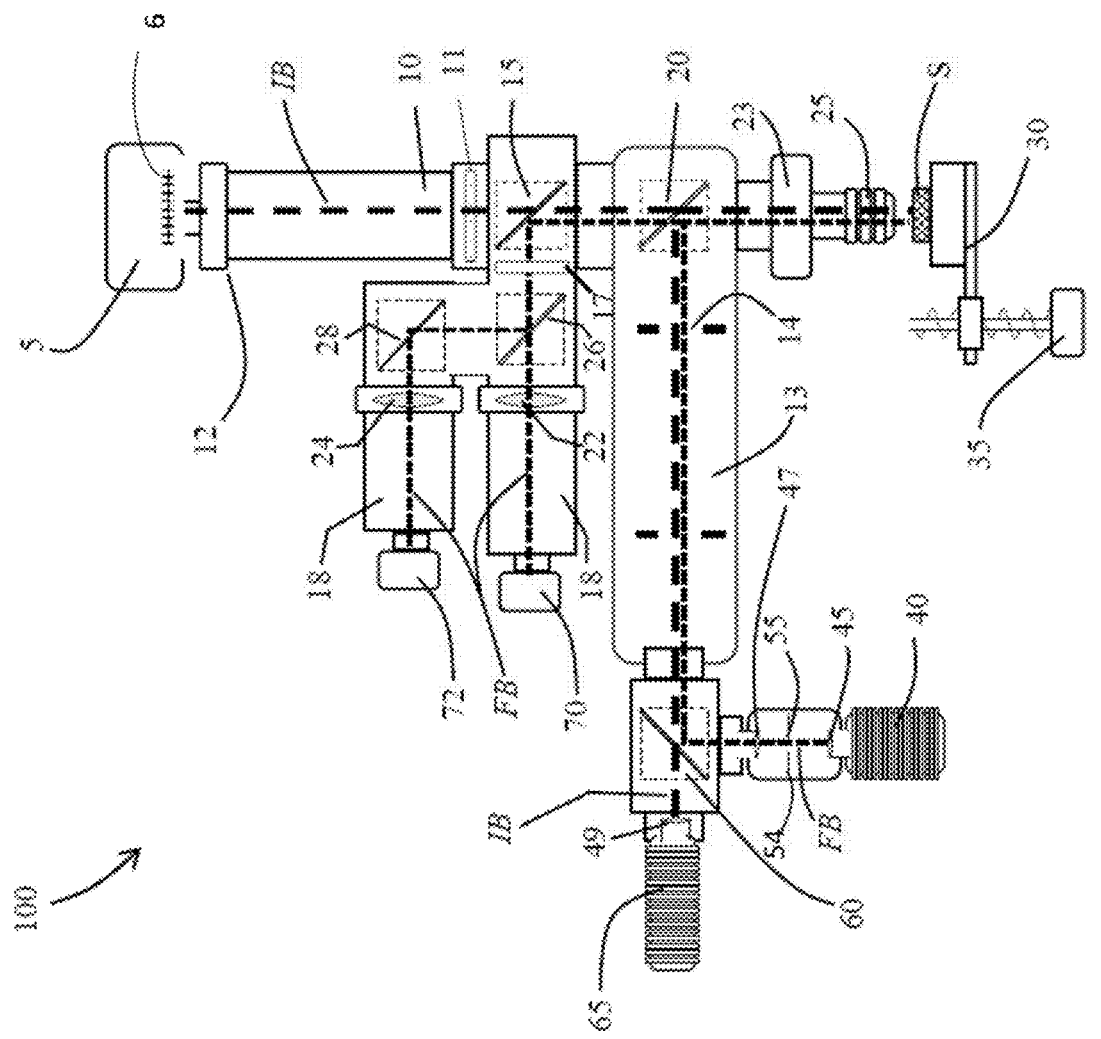
FIG. 4 shows an example of an optical pathway in accordance with some embodiments of the disclosed subject matter.

FIG. 4 shows example optical pathways, represented by a pair of dashed lines, for automatic focus system 100, in accordance with some embodiments of the disclosed subject matter. Automatic focus system 100 can be configured so that the light emitted from secondary illumination source 40 (the "focusing beam (FB)," as represented by the shorter dashed lines) is projected onto specimen S and then reflected to focusing cameras 70 and 72. Autofocus system 100 can also be configured so that light emitted from primary illumination source 65 (the "imaging beam (IB)," as represented by the longer dashed lines) is projected onto specimen S and then reflected to imaging camera 5.

More specifically, in some embodiments, the focusing beam can travel from illumination source 40 through focusing pattern 55 to dichroic 60. Dichroic 60 can reflect the focusing beam towards vertical illuminator 13.

The imaging beam can travel from primary illumination source 65, pass through dichroic 60 to combine with the focusing beam.

The combined beam can then travel through vertical illuminator 13 to prism 20. Prism 20 can reflect the light coming from the illumination sources at 90° downwards through a nosepiece and objective 25 to a specimen S. Specimen S can reflect the combined beam upwards through objective 25, which is then transmitted through prism 20 towards dichroic 15. Dichroic 15 can separate the transmitted beam back into the imaging beam and focusing beam by, for example, reflecting the wavelengths of the focusing beam towards focusing cameras 70 and 72 and by allowing the wavelengths of the imaging beam to pass through towards camera 5.

In some embodiments, the focusing beam that is reflected by dichroic 15 can pass through cutoff filter 17 to remove any light above the cutoff wavelength. The focusing beam can then travel to beam splitter 26. Beam splitter 26 can send 50% of the focusing beam towards primary focusing camera 70 by directing the light through focusing lens 22 located in focusing housing 18. From there the focusing beam, can travel to a light sensor 71 (FIG. 3) in camera 70. The other 50% of the focusing beam can be directed by beam splitter 26 upwards towards mirror 28. Mirror 28 can reflect the focusing beam towards focusing lens 24 locating in focusing housing 19. From there the focusing beam can be directed to sensor 73 (FIG. 3) in offset camera 72.

In some embodiments, the imaging beam that passes through dichroic 15 can pass through an optical filter 11 (e.g., a filter that transmits only the wavelengths from the imaging beam), up through tube lens 10, and to camera sensor 6 located in imaging camera 5.

In some embodiments, primary focusing camera 70 can be used to determine the in-focus point of a specimen. The focus of a specimen can be adjusted, for example, by moving the objective and stage closer together or farther apart along a Z axis (as shown in FIG. 1). More particularly, primary focusing camera 70 can be used to obtain an image of a specimen at two or more Z positions (e.g., by moving stage 30 and/or objective 25 in a Z direction). From the resulting images, a relative sharpness value can be calculated by control system 108 for each Z position of the specimen to determine the quality of focus. Automatic focus system 100 can use any suitable sharpness equation to calculate the relative sharpness of the resulting images. One example equation that can be used by automatic focus system 100 to calculate a relative sharpness score is a measure of image variance V, normalized by the mean $\mu$ to account for intensity fluctuations:

$$V = \frac{1}{\mu} \sum_{i=1}^{N} \sum_{j=1}^{M} [s(i, j) - \mu]^2$$

where $s(i,j)$ is the grayscale pixel value at coordinates $(i,j)$ and N and M represent the number of pixels in the i and j directions respectively. Other example methods for calculating a relative sharpness value that can be used by automatic focus system 100 are described by Sivash Yazdanfar et al., "Simple and Robust Image-Based Autofocusing for Digital Microscopy," Optics Express Vol. 16, No. 12, 8670 (2008), which is hereby incorporated by reference herein in its entirety. The above disclosed methods are just examples and are not intended to be limiting.

Figure 5:
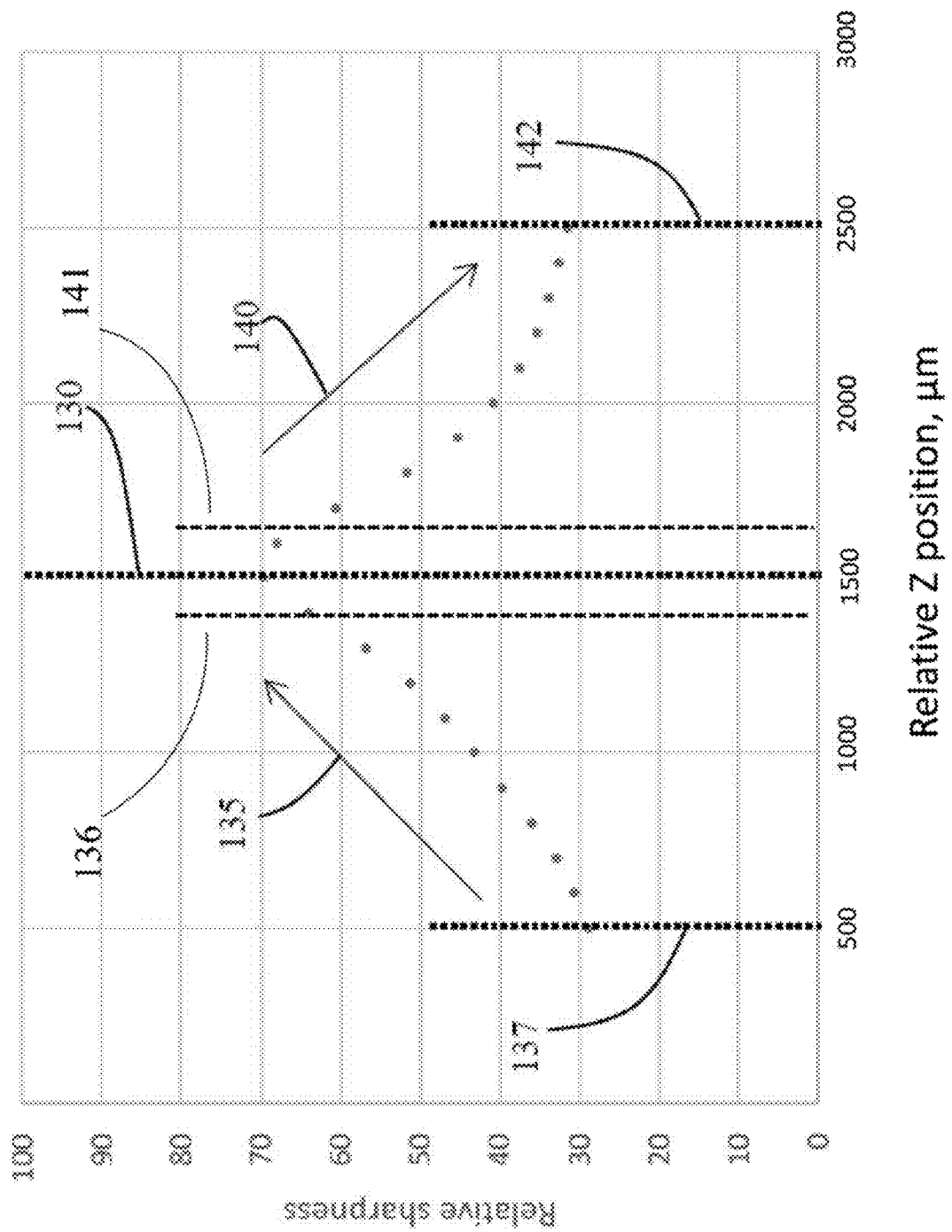
FIG. 5 shows an example of a sharpness curve for a primary focusing camera in accordance with some embodiments of the disclosed subject matter.

FIG. 5 shows a graph comprising an X axis that represents the relative position of a specimen in a Z direction (the "Z position") and a Y axis representing a relative sharpness score. The relative Z position represents the distance between the top of stage 30 and the objective 25. The Z position can be changed either by adjusting a stage 30 towards or away from objective 25 and/or by adjusting objective 25 towards or away from stage 30. The sharpness curve shown in FIG. 5 compares, at each measurement point along the curve, the relative sharpness of an image captured by primary focusing camera 70 with the relative Z position. As shown in FIG. 5, the sharpness value for a specimen can have a largest measured sharpness (e.g., sharpness score of 70 in FIG. 5) at a given relative position (e.g., Z position 130) (that can be referred to as the in-focus position) and may decrease symmetrically on each side of the in-focus position (e.g., Z position 130). In some instances, the slope of the curve in FIG. 5 at the in-focus position can be zero or close to zero. It should be understood that the term "in focus" as used herein is intended to denote when the relative positioning of the objective and the stage are such that a sharpness measurement is at a point at or near the top of a sharpness curve. The term "in focus" is not intended to be limited to perfect or optimal focus.

The range of coarse Z movement is represented by lines 137 (e.g., at 500 um) and 142 (e.g., at 2500 µm). The range of fine focus Z movement is represented by lines 136 (e.g., at 1400 µm) and 141 (e.g., at 1600 µm). Note, that the range of Z movement refers to a practical range of movement to achieve different Z positions between objective 25 and stage 30. The range of Z movement also refers to the range of Z movement where a sharpness calculation can be used to focus a specimen. Arrow 135 shows the sharpness score increasing to a maximum point at Z position 130 (indicating that the image is considered to be in focus as described above) as stage 30 and objective 25 move farther apart and arrow 140 shows the sharpness score decrease from maximum point at Z position 130 as stage 30 and objective 25 continue to move farther apart.

Figure 6:
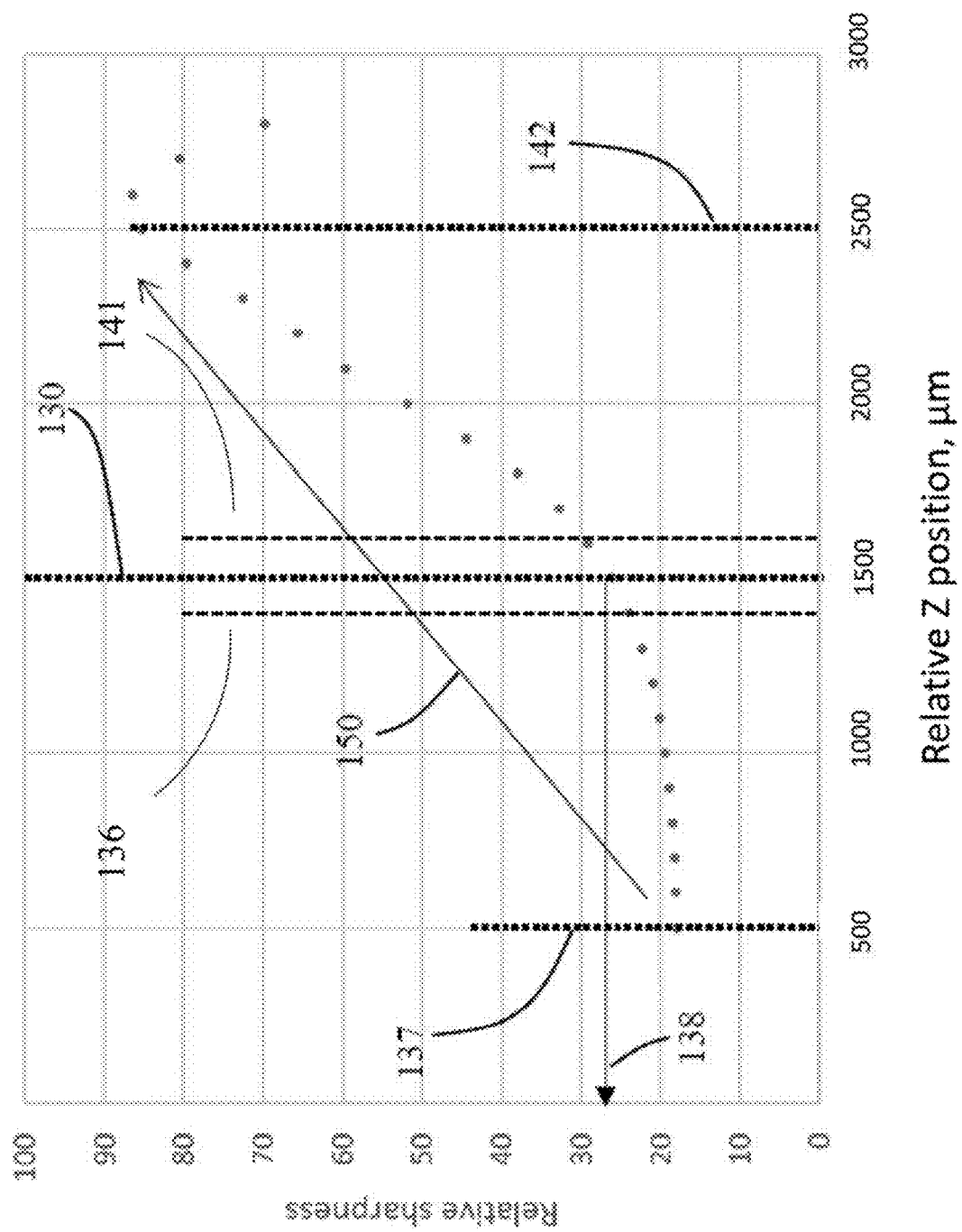
FIG. 6 shows an example of a sharpness curve for an offset focusing camera in accordance with some embodiments of the disclosed subject matter.

FIG. 6 shows an example sharpness curve for offset focusing camera 72. Similar to FIG. 5, the X axis of the graph represents the relative Z position, the Y axis represents a relative sharpness score and line 130 indicates the Z position where the maximum measured sharpness value for primary focusing camera 70 is found. The sharpness curve shown in FIG. 6 compares, at each point along the curve, the relative sharpness of an image captured by offset focusing camera 72 with the relative Z position. In some embodiments, automatic focus system 100 can use the same equation to calculate the sharpness curve for primary focusing camera 70 and offset focusing camera 72.

As shown in the example of FIG. 6, at the in-focus position (e.g., Z position 130) determined using primary focusing camera 70 as described above in connection with FIG. 5, the relative sharpness value for an image captured by offset focusing camera 72 is around 28 (as indicated by arrow 138). This value (e.g., 28) can be stored by control system 108 as the sharpness setpoint for offset camera 72 for that particular specimen, specimen class and/or any other suitable classification group. In some embodiments, a specimen class can be defined based on specimens made from materials of similar reflective qualities. Some example specimen classes can include, but are not limited to: a bare silicon wafer; a semiconductor wafer with a known pattern; and a biological specimen of the same known substances prepared consistently with a glass slide and cover slip.

As shown in FIG. 6, the sharpness curve for the images taken by offset focusing camera 72 is constantly increasing (as represented by arrow 150) between lines 137 and 142 (representing the range of Z movement). Once the sharpness setpoint for a specimen or a class of specimens is found, then offset focusing camera 72 can be used to determine whether to move stage 30 and objective 25 closer together or farther apart. For example, if the sharpness setpoint of a specimen is determined to be 28, and stage 30 is translated in an X/Y plane perpendicular to the Z axis such that the specimen is no longer in focus, then the sharpness value of an image captured by the offset focusing camera 72 can be used, together with the sharpness setpoint and the sharpness curve, to bring the specimen back in focus. For example, if the sharpness setpoint for the image of the specimen, as captured by offset focusing camera 72, is 28 as described above and a relative sharpness value of an image of the specimen, post stage translation, as captured by offset focusing camera 72 is 52 (for example), then, as evident from the sharpness curve in FIG. 6, the distance between the stage and objective must be decreased (e.g., from 2000 µm to 1500 µm) to bring the specimen back into focus. On the other hand, if the relative sharpness value for the image of the specimen as captured by offset focusing camera 72 is less than 28 (e.g., at 20), then, as evident from the sharpness curve in FIG. 6, the distance between the stage and objective must be increased (e.g., from 1000 µm to 1500 µm) to bring the specimen back into focus. Since the relative sharpness curve of offset focusing camera 72, together with the sharpness setpoint, indicates whether the distance between the stage and objective must be decreased or increased, fewer images of the specimen can be taken to bring a specimen back into focus.

This same information about whether to move the stage and objective closer together or farther apart cannot be gleaned from the sharpness curve shown in FIG. 5. For example, as shown in FIG. 5, if the largest measured sharpness value of a specimen, as captured by primary focusing camera 70, is 70, and the actual sharpness value of the specimen is measured to be 51, then the sharpness curve shows that the relative Z position can be either to the right or the left of the in-focus point at Z position 130. Because the relative Z position can be either to the right or the left of the in-focus point at Z position 130, the sharpness curve cannot be used to determine whether to move the stage and objective closer together or farther apart.

Figure 7:
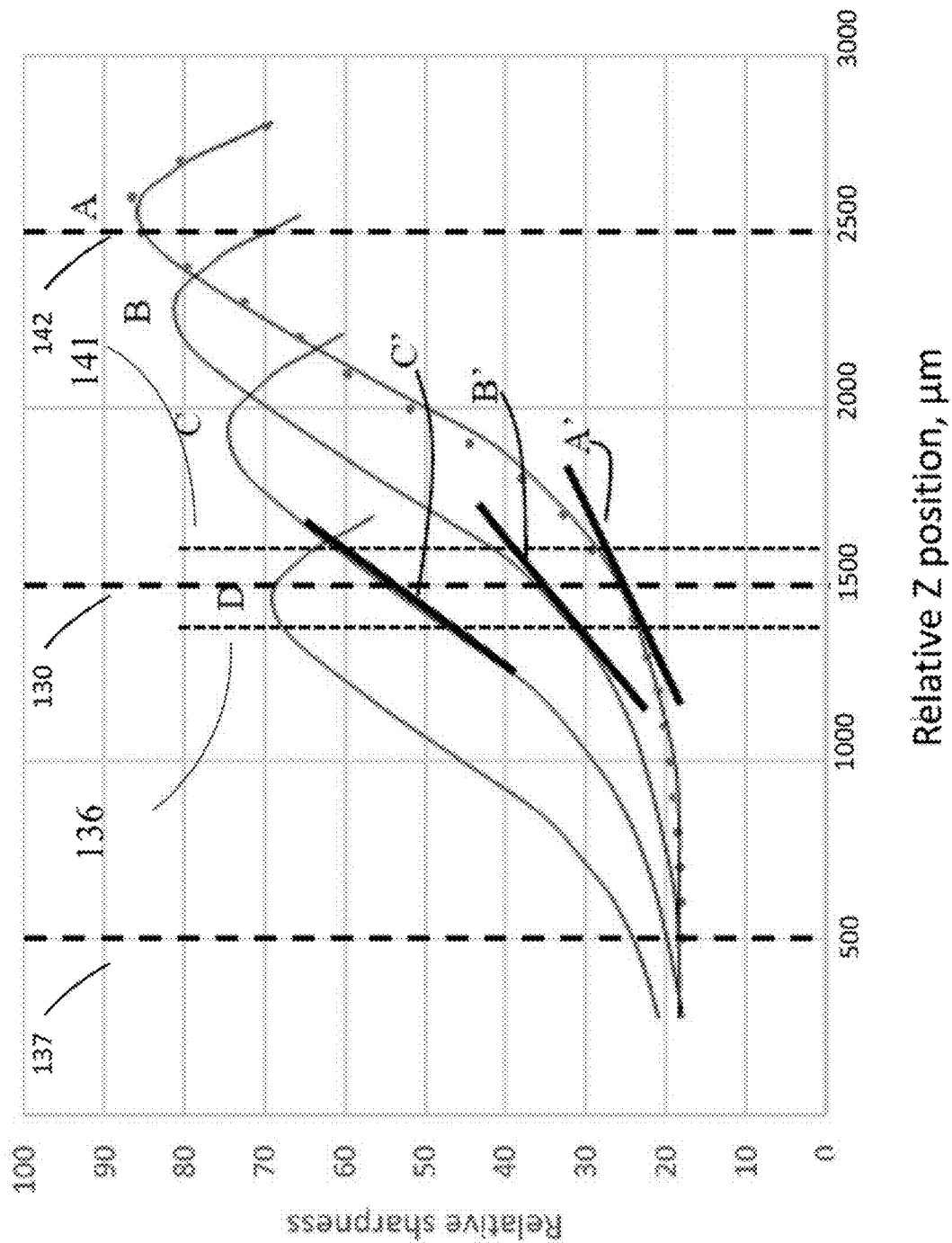
FIG. 7 shows an example of a sharpness curves for an offset focusing camera at different distances from an image-forming conjugate plane in accordance with some embodiments of the disclosed subject matter.

FIG. 7 shows different example sharpness curves (i.e., sharpness curves A, B and C) for offset focusing camera 72 when it is positioned at different distances from image-forming conjugate plane 80 (as shown in FIG. 3). Similar to FIG. 6, the X axis of the graph in FIG. 7 represents the relative Z position, the Y axis represents a relative sharpness score and line 130 indicates the Z position where the maximum measured sharpness value for primary focusing camera 70 is found. Sharpness curves A, B and C compare, at each point along the curves, the relative sharpness of an image captured by offset focusing camera 72 with the relative Z position. Sharpness curve D compares, at each point along the curve, the relative sharpness of an image captured by primary focusing camera 70 with the relative Z position. In some embodiments, automatic focus system 100 uses the same sharpness equation to calculate sharpness curves A, B, C and D. Note that the positioning of offset focusing camera 72 herein refers to the positioning of sensor 73 in focusing camera 72.

Out of the three sharpness curves, curve C represents the sharpness curve for offset focusing camera 72 when it is closest to image-forming conjugate plane 80. Curve B represents a sharpness curve for offset focusing camera 72 when the offset camera is at a distance farther than its offset distance for curve C, but closer than its offset distance for curve A. Curve A represents a sharpness curve for offset focusing camera 72 when the offset camera is farthest away from image-forming conjugate plane 80. The offset distance refers to the distance between sensor 73 of offset focusing camera 72 and image-forming conjugate plane 80.

Lines A', B' and C' represent the slopes of the respective curves A, B and C at the Z position (e.g., line 130) where the specimen is considered to be in focus (as described above in connection with FIG. 5) for primary focusing camera 70. The slopes of the curves become steeper as offset focusing camera 72 moves closer to image-forming conjugate plane 80. A steeper slope, represents a larger change in sharpness versus a smaller change in Z height (also referred to as greater resolution). A steeper slope is desirable because it allows for finer focal adjustment and control.

In some embodiments, the range of Z movement necessary to bring a specimen in focus can determine the offset distance. The range of Z movement can be based on, for example: the thickness and/or any other suitable characteristic of a specimen; the specimen class and/or any other suitable grouping of the specimen; and/or the optical characteristics of the microscope (e.g., the magnification of the objective). The range of Z movement can also be chosen to encompass a wide range of specimen types to prevent having to constantly adjust the offset distance.

In some embodiments, to determine the appropriate offset distance for automatic focus system 100, offset focusing camera 72 can be positioned at different offset distances. A sharpness curve can be calculated at each offset distance. The offset distance that produces a sharpness curve that represents a desired range of Z movement and is constantly increasing (represented by a positive slope) or decreasing (represented by a negative slope) in that range, can be selected.

More specifically, if the range of Z movement is large (e.g., the distance between lines 137 and 142 shown in FIG. 7), then offset focusing camera 72 can be positioned farther away from image-forming conjugate plane 80 (as represented by curve A). For example, if the desired range of Z movement is between 500 μm and 2500 μm (as represented by lines 137 and 142), then the offset camera should not be positioned at the offset distance that produced curve B or curve C, because curves B and curves C both increase and decrease in the desired range of Z movement and cannot be used to determine whether to move the specimen and objective closer together or farther apart.

In some embodiments, the offset distance can also be based on the steepness of the sharpness curve at the position where the specimen is in optimum focus for primary focusing camera 70 (e.g., as represented by lines A', B' and C'). For example, if the range of Z movement necessary to bring a specimen in focus is small (e.g., between 1300 μm-1700 μm), then offset focusing camera 72 can be placed closer to image-forming conjugate plane 80 (e.g., at the offset distance that produced curve C). Even though a larger offset distance can produce acceptable sharpness curves (e.g., curves B and A), the position of offset focusing camera 72 that produces curve C can be selected because that position has the steepest slope and greatest resolution compared to an offset distance farther away from image-forming conjugate plane 80. In some embodiments, a position farther away from the image-forming conjugate plane 80 can be selected to accommodate a maximum range of Z movement for automatic focus system 100, so that the offset focusing camera 72 does not have to constantly be repositioned for specimens of varying thicknesses.

Note that offset focusing camera 72 can be positioned at an offset distance to the right or to the left of image-forming conjugate plane 80. The sharpness slope over the range of Z movement when positioned to the right or to the left will be moving in one direction and opposite of each other. For example, if offset focusing camera 72 is positioned to the right of image-forming conjugate plane 80 and the sharpness slope is increasing over the range of increasing Z values, then if the offset focusing camera 72 is positioned to the left of image-forming conjugate plane 80, the sharpness slope will be the opposite (i.e., decreasing over the range of increasing Z values). In other words, the sign of the sharpness slope (i.e., whether the slope is positive or negative) depends on whether the offset focusing camera is to the right or left of the image forming conjugate plane. Therefore, if the relative position of the offset focusing camera (i.e., whether the offset focusing camera is to the right or left of the image forming conjugate plane), the sharpness setting, and a sharpness value are known, then whether to increase or decrease the relative positioning of the objective and the stage to achieve better focus can be inferred.

In some embodiments, the offset distance for offset focusing camera 72 can be set once for automatic focus system 100. In other embodiments, the offset distance can vary to accommodate different objectives, different specimen thicknesses, different specimen classes or any other suitable criteria. For example, offset camera 72 can be moved closer to image-forming conjugate plane for higher magnification objectives to accommodate a smaller depth of field (focus) and smaller range of Z movement. In some embodiments the offset distance can be saved by control system 108 as an offset distance setpoint. The offset distance setpoint can be associated, for example, with the thickness and/or any other suitable characteristic of a specimen, the specimen class and/or any other suitable grouping of the specimen, and/or the optical characteristics of the microscope (e.g., the magnification of an objective). The offset distance setpoint can be used to automatically position offset focusing camera 72.

Figure 8:
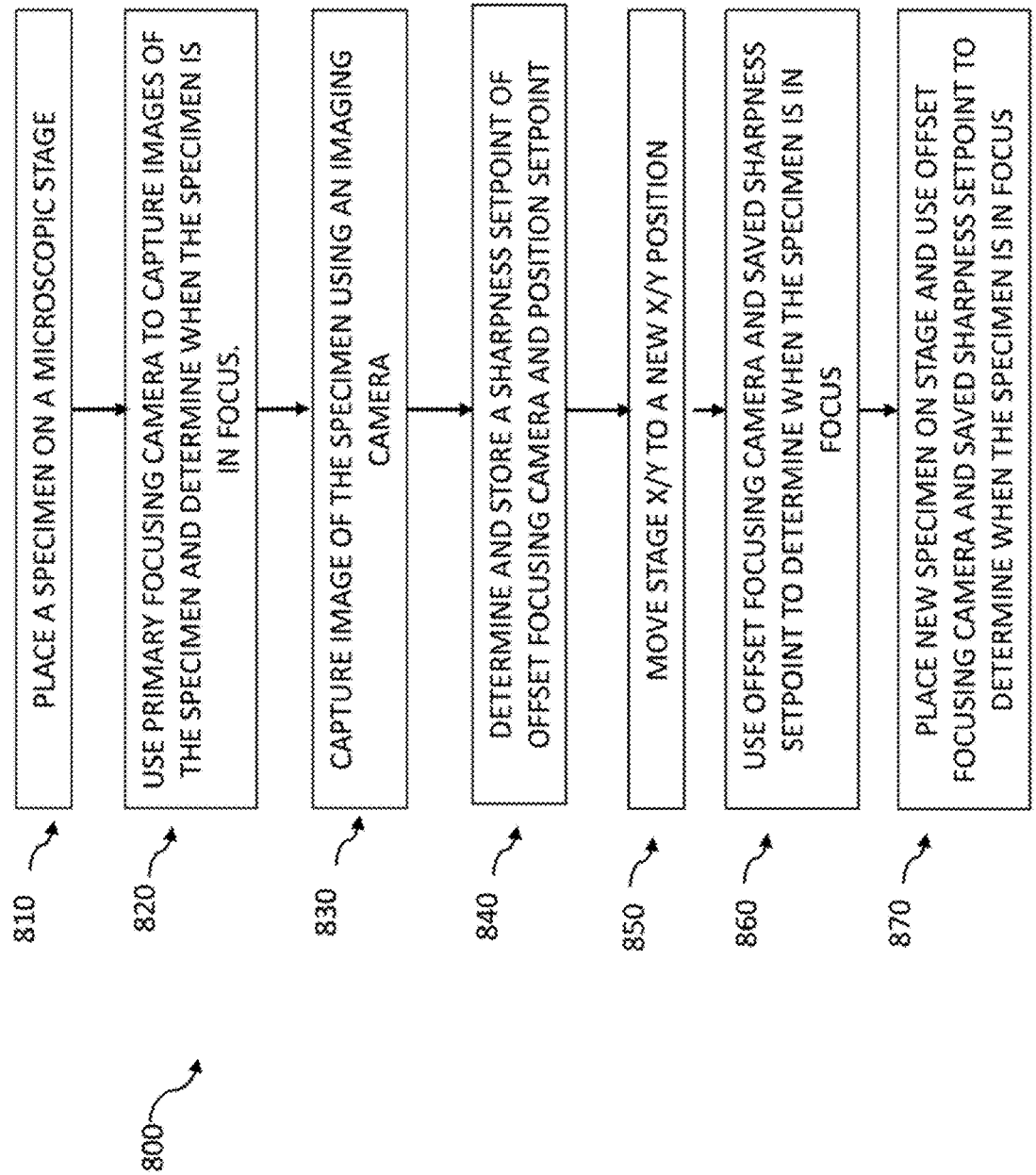
FIG. 8 shows an example of a flow chart of a process for performing automatic focus using an automatic focus system, such as the system illustrated in FIG. 1, in accordance with some embodiments of the disclosed subject matter.

FIG. 8, with further reference to FIGS. 1-7, shows at a high level, an example of an automatic focus operation of automatic focus system 100, in accordance with some embodiments of the disclosed subject matter. Automatic focus process 800 can use automatic focus system 100.

At 810, a specimen can be placed on stage 30.

If automatic focus system 100 does not know a sharpness setpoint for the specimen (e.g., the value can be obtained by user input or a prior value stored by control system 108 and associated with a particular specimen, a particular specimen class and/or any other suitable classification group for the specimen), then at 820 control system 108 can move stage 30 and objective 25 closer together and/or farther apart until the control system determines, using a suitable sharpness algorithm (as discussed above in connection with FIG. 5), that the images captured by primary focusing camera 70 are in focus (e.g., control system 108 determines the in-focus position (e.g., at Z position 130, i.e., the Z position when the specimen is considered to be in focus for primary focusing camera 70 as shown in FIG. 5). In some embodiments, imaging camera 5 can be used, instead of primary focusing camera 70, to determine the largest measured sharpness value for a specimen. In some embodiments, a sharpness curve can be calculated for offset focusing camera 72 based on images captured by the offset focusing camera 72 at the various Z positions of the stage and objective during the focusing process. The sharpness curve for offset focusing camera 72 can be stored as a sharpness curve setpoint and associated with a particular specimen, a particular specimen class and/or any other suitable classification group for the specimen.

At 830, in some embodiments, once the specimen is determined to be in focus, an in-focus image can be captured by imaging camera 5.

At 840, once the specimen is determined to be in focus by primary focusing camera 70 (or imaging camera 5), an image of the specimen can be captured by offset focusing camera 72. A sharpness value for the captured imaged can be calculated (e.g., using the same sharpness equation used for the primary focusing camera 70) and stored by control system 108. The stored value can be stored as the in-focus sharpness setpoint and associated with a particular specimen, a particular specimen class and/or any other suitable classification group for the specimen. In some embodiments, when the specimen is in focus for primary camera 70 or imaging camera 5, the absolute position of: stage 30; objective 25; the top of the specimen on stage 30; and/or the distance between the top of stage 30 and objective 25, can be stored by control system 108 as a position setpoint. The position setpoint can be associated with a particular specimen, a particular specimen class and/or any other suitable classification group for the specimen.

At 850, stage 30 can be moved in an X/Y plane perpendicular to the Z axis.

At 860, in some embodiments, offset camera 72 can be used to capture an image of the specimen at the new X, Y position of stage 30 and control system 108 can calculate the sharpness value for that image. Based on the sharpness value of the image compared to the in-focus sharpness setpoint, control system 108 can determine whether the specimen is in focus at stage 30's new X, Y coordinates or the Z height needs to be adjusted, so that the specimen is brought back in focus. For example, based on the sharpness curve shown in FIG. 6, if the calculated sharpness value is greater than the stored in-focus sharpness setpoint, then stage 30 and objective 25 can be brought closer together in a Z direction until the sharpness value of an image captured by offset camera 72 is calculated to be the same as the stored sharpness setpoint. Conversely, if the calculated sharpness value is less than the stored in-focus sharpness setpoint, then the stage and objective can be brought farther apart in a Z direction until the sharpness value of an image captured by offset camera 72 is calculated to be the same as the stored in-focus sharpness setpoint. The direction to adjust the Z position can be determined either from a sharpness curve captured for offset camera 72 during the focusing process at 820 or based on the position of offset focusing camera 72 in relation to the image-forming conjugate plane 72. This process for calculating the sharpness value of an image by the offset focusing camera and comparing it to a stored in-focus sharpness setpoint can be repeated each time the X,Y coordinates of stage 30 changes.

At 870, a new specimen can be placed on stage 30. If control system 108 determines that there is a sharpness setpoint already associated with the specimen, the specimen class and/or any other suitable classification group for the specimen, then the control system can use images captured by offset focusing camera 72, as described at 840, to determine when the new specimen is in focus. For example, an image of the new specimen can be captured by offset focusing camera 72 and the sharpness value can be compared with the sharpness setpoint associated with the new specimen. The stage and objective can be brought closer together or farther apart in a Z direction until the sharpness value of an image captured by offset camera 72 is calculated to be the same as the stored sharpness setpoint.

In some embodiments, once the calculated sharpness value for a specimen, using offset focusing camera 72, corresponds to the sharpness setpoint, primary focusing camera 70 can be used to fine tune the focus of the specimen and the sharpness setpoint of offset focusing camera 72. For example, using primary focusing camera 70, sharpness values can be calculated for at least two relative Z positions of the stage and objective to determine whether an estimated maximum sharpness has been achieved or the relative Z-position needs to be adjusted to achieve an estimated maximum sharpness (i.e., the point on the sharpness curve where the slope is 0 or close to 0). Once an estimated maximum sharpness is achieved, the sharpness value of the specimen, using offset focusing camera, can be calculated and stored as the new sharpness setpoint.

In some embodiments, control system 108 can also determine whether there is a position setpoint associated with the new specimen, specimen class and/or any other suitable classification group for the specimen, and can position autofocus system 100 at that position setpoint before it begins the aforementioned focusing process. Knowing the relative Z position, reduces the relative Z distance that is needed to focus the specimen and allows the offset camera to be positioned closer to the image-forming conjugate plane. As discussed above in connection with FIG. 7, the slope of the sharpness curve can become steeper as offset focusing camera 72 moves closer to the image-forming conjugate plane. A steeper slope, represents greater resolution or a larger change in sharpness versus a smaller change in Z height. A steeper slope can allows for finer focal adjustment and control.

The division of when the particular portions of process 800 are performed can vary, and no division or a different division is within the scope of the subject matter disclosed herein. Note that, in some embodiments, blocks of process 800 can be performed at any suitable times. It should be understood that at least some of the portions of process 800 described herein can be performed in any order or sequence not limited to the order and sequence shown in and described in the FIG. 8 in some embodiments. Also, some of the portions of process 800 described herein can be or performed substantially simultaneously where appropriate or in parallel in some embodiments. Additionally or alternatively, some portions of process 800 can be omitted in some embodiments.

Process 800 can be implemented in any suitable hardware and/or software. For example, in some embodiments, process 800 can be implemented in control system 108.

The automatic microscopic focus system and method have been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure. The scope of the invention is limited only by the claims that follow.

What is claimed is:

1. A system for automatically focusing a microscope, comprising:
    a first image sensor, configured for focusing, positioned on an image forming conjugate plane;

a second image sensor, configured for focusing, positioned at an offset distance from the image forming conjugate plane; and a hardware processor coupled to the first image sensor and the second image sensor that is configured to:

determine, using the first image sensor, when a specimen is in focus;

determine, using the second image sensor, a sharpness setpoint for the specimen when the specimen is determined to be in focus for the first image sensor;

after movement of the specimen, determine, using the second image sensor, a first sharpness value of the specimen;

perform at least one of: determine whether the first sharpness value of the specimen is higher than the sharpness setpoint; and determine whether the first sharpness value of the specimen is lower than the sharpness setpoint; and adjust the microscope so that a second sharpness value of the specimen determined using the second image sensor corresponds to the sharpness setpoint.

2. The system of claim 1, wherein the hardware processor is further configured to:

determine a sharpness curve for the specimen using the second image sensor; and adjust the microscope based on the sharpness curve so that the second sharpness value of the specimen determined using the second image sensor corresponds to the sharpness setpoint.

3. The system of claim 1, further comprising:

a first filter positioned in a first optical path between a second illumination source and the first image sensor to prevent light from the second illumination source from reaching the first image sensor; and a second filter positioned in a second optical path between a first illumination source and the second image sensor to prevent light from the first illumination source from reaching the second image sensor.

4. The system of claim 1, wherein the first image sensor is also configured for taking images of the specimen when the specimen is determined to be in focus.

5. The system of claim 1, further comprising a field diaphragm positioned in an optical path between a primary illumination source and an objective.

6. The system of claim 1, wherein the hardware processor is further configured adjust the microscope to achieve a coarse focus and a fine focus.

7. The system of claim 1, wherein adjusting the microscope so that the second sharpness value of the specimen determined using the second image sensor corresponds to the sharpness setpoint comprises repeatedly:

adjusting the microscope;

determining the second sharpness value using the second image sensor; and comparing the second sharpness value to the sharpness setpoint.

8. The system of claim 1, wherein the hardware processor is further configured to save an adjustment setting of the microscope.

9. The system of claim 8, wherein the saved adjustment setting is used to determine a position of the second image sensor relative to the second image forming conjugate plane.

10. A system for automatically focusing a microscope, comprising:

a first image sensor, configured for taking images of a specimen when the specimen is determined to be in focus, positioned on an image forming conjugate plane;

a second image sensor, configured for focusing, positioned on a second image forming conjugate plane;

a third image sensor, configured for focusing, positioned at an offset distance from the second image forming conjugate plane; and a hardware processor coupled to the second image sensor and the third image sensor that is configured to:

determine, using the second image sensor, when the specimen is in focus;

determine, using the third image sensor, a sharpness setpoint for the specimen when the specimen is determined to be in focus for the second image sensor;

after movement of the specimen, determine, using the third image sensor, a first sharpness value of the specimen;

perform at least one of: determine whether the first sharpness value of the specimen is higher than the sharpness setpoint; and determine whether the first sharpness value of the specimen is lower than the sharpness setpoint; and adjust the microscope so that a second sharpness value of the specimen determined using the third image sensor corresponds to the sharpness setpoint.

11. The system of claim 10, wherein the hardware processor is further configured to:

determine a sharpness curve for the specimen using the third image sensor; and adjust the microscope based on the sharpness curve so that the second sharpness value of the specimen determined using the third image sensor corresponds to the sharpness setpoint.

12. The system of claim 10, further comprising:

a first filter positioned in a first optical path between a second illumination source and the first image sensor to prevent light from the second illumination source from reaching the first image sensor; and a second filter positioned in a second optical path between a first illumination source and the second and third image sensors to prevent light from the first illumination source from reaching the second and third image sensors.

13. The system of claim 10, further comprising a field diaphragm positioned in an optical path between a first illumination source and an objective.

14. The system of claim 10, wherein the hardware processor is further configured to adjust the microscope to achieve a coarse focus and a fine focus.

15. The system of claim 10, wherein adjusting the microscope so that the second sharpness value of the specimen determined using the third image sensor corresponds to the sharpness setpoint comprises repeatedly:

adjusting the microscope;

determining the second sharpness value using the third image sensor; and comparing the second sharpness value to the sharpness setpoint.

16. The system of claim 10, wherein the hardware processor is configured to save an adjustment setting of the microscope.

17. The system of claim 16, wherein the saved adjustment setting is used to determine a position of the third image sensor relative to the third image forming conjugate plane.

* * * * *